United States Patent [19]

Wilson et al.

[11] Patent Number: 4,670,213
[45] Date of Patent: Jun. 2, 1987

[54] REMOVABLE TOP NOZZLE SUBASSEMBLY FOR A RECONSTITUTABLE NUCLEAR FUEL ASSEMBLY

[75] Inventors: John F. Wilson, Murrysville; Robert K. Gjertsen, Monroeville, both of Pa.

[73] Assignee: Westinghouse Electric Corp., Pittsburgh, Pa.

[21] Appl. No.: 701,049

[22] Filed: Feb. 12, 1985

[51] Int. Cl.$^4$ ............................................. G21C 3/32
[52] U.S. Cl. .................................... 376/446; 376/364
[58] Field of Search ............. 376/178, 285, 353, 364, 376/443, 445, 446, 449

[56] References Cited

U.S. PATENT DOCUMENTS

| | | | |
|---|---|---|---|
| 3,770,583 | 11/1973 | Klumb et al. | 376/449 |
| 3,814,667 | 6/1974 | Klumb et al. | 376/364 |
| 3,971,575 | 7/1976 | Leshcom et al. | 376/364 |
| 4,155,808 | 5/1979 | Jabsen | 376/449 |
| 4,269,661 | 5/1981 | Kmonk et al. | |
| 4,278,501 | 7/1981 | Steinke | 376/364 |
| 4,376,092 | 3/1983 | Kmonk et al. | 376/353 |
| 4,534,933 | 8/1985 | Gjertsen et al. | 376/364 |

Primary Examiner—Deborah L. Kyle
Assistant Examiner—Richard L. Klein

[57] ABSTRACT

An improved top nozzle has an enclosure with a lower adapter plate and an upstanding sidewall surrounding and attached to the periphery thereof and an upper hold-down plate spaced above the adapter plate for abutmnet with a lower side of an upper core plate by a plurality of coil springs disposed between the lower and upper plates. The lower adapted plate and upper hold-down plate have respective openings and passageways defined therethrough in a pattern which matches that of the upper ends of the guide thimbles of the fuel assembly to which the improved top nozzle is attached. The upper ends of the guide thimbles extend upwardly through the adapter plate which is stationarily mounted on the guide thimbles. Tubular sleeves disposed between the lower and upper plates are surrounded by respective coil springs. The lower ends of the sleeves are releasably threaded to the upper ends of the guide thimbles, while the upper ends of the sleeves extend into the passageways of the upper hold-down plate. Bosses are disposed above the hold-down plate and connected thereto such that respective bores through the bosses are aligned with passageways of the hold-down plate. The bosses extend into holes in the upper core plate for aligning the fuel assembly with the upper core plate and for receiving the upper ends of the guide thimbles as the fuel assembly vertically moves upwardly relative to the upper core plate. A plurality of lugs on the periphery of the upper hold-down plate are coupled to the sidewall of the enclosure for accommodating vertical movement of the fuel assembly relative to the upper core plate.

23 Claims, 14 Drawing Figures

REMOVABLE TOP NOZZLE SUBASSEMBLY FOR A RECONSTITUTABLE NUCLEAR FUEL ASSEMBLY

CROSS REFERENCE TO RELATED APPLICATION

Reference is hereby made to the following copending application dealing with related subject matter and assigned to the assignee of the present invention: "Reconstitutable Nuclear Reactor Fuel Assembly With Unitary Removable Top Nozzle Subassembly" by John M. Shallenberger, assigned U.S. Ser. No. 673,681 and filed Nov. 20, 1984, a continuation-in-part of copending U.S. patent application Ser. No. 457,790, filed Jan. 13, 1983.

BACKGROUND OF THE INVENTION

1. Field of the Invention

The present invention relates generally to fuel assemblies for nuclear reactors and, more particularly, is concerned with a top nozzle incorporating improvements which eliminate relative sliding engagement between the upper support plate of the reactor core and the hold-down structure of the top nozzle while providing removable mounting of the top nozzle as a unitary subassembly on the guide thimbles of a reconstitutable fuel assembly as well as desired alignment of the fuel assembly with the upper core support plate.

2. Description of the Prior Art

Conventional designs of fuel assemblies include a multiplicity of fuel rods held in an organized array by grids spaced along the fuel assembly length. The grids are attached to a plurality of control rod guide thimbles. Top and bottom nozzles on opposite ends of the fuel assembly are secured to the control rod guide thimbles which extend above and below the opposite ends of the fuel rods. At the top end of the fuel assembly, the guide thimbles are attached in openings provided in the top nozzle. Conventional fuel assemblies also have employed a fuel assembly hold-down device to prevent the force of the upward coolant flow from lifting a fuel assembly into damaging contact with the upper core support plate of the reactor, while allowing for changes in fuel assembly length due to core induced thermal expansion and the like. Such hold-down devices have included the use of springs surrounding the guide thimbles, such as seen in U.S. Pat. Nos. 3,770,583 and 3,814,667 to Klumb et al and U.S. Pat. No. 4,269,661 to Kmonk et al.

Due to occasional failure of some fuel rods during normal reactor operation and in view of the high costs associated with replacing fuel assemblies containing failed fuel rods, the trend is currently toward making fuel assemblies reconstitutable in order to minimize operating and maintenance expenses. Conventional reconstitutable fuel assemblies incorporate design features arranged to permit the removal and replacement of individual failed fuel rods. Reconstitution has been made possible by providing a fuel assembly with a removable top nozzle. The top nozzle is mechanically fastened usually by a threaded arrangement to the upper end of each control rod guide thimble, and the top nozzle can be removed remotely from an irradiated fuel assembly while it is still submerged in a neutron-absorbing liquid. Once removal and replacement of the failed fuel rods have been carried out on the irradiated fuel assembly submerged at a work station and after the top nozzle has been remounted on the guide thimbles of the fuel assembly, the reconstituted assembly can then be reinserted into the reactor core and used until the end of its usefuel life.

One type of such reconstitutable fuel assembly can be seen in the aforementioned Klumb et al patents. The fuel assembly of Klumb et al includes a top nozzle which incorporates a hold-down plate and also coil springs coaxially disposed about upwardly extending alignment posts. The alignment posts extend through an upper end plate, spaced below the hold-down plate, and are joined thereto and to the upper ends of the guide thimbles with fastener nuts located on the underside of the upper plate. The upper hold-down plate is slidably mounted on the alignment posts and the coil springs are interposed, in compression, between the hold-down plate and the end plate. A radially enlarged shoulder on the upper end of each of the alignment posts retains the hold-down plate on the posts.

However, the Klumb et al reconstitutable fuel assembly involves a top nozzle arrangement which is difficult to remove and reattach both due to the location of the fasteners and because removal appears to cause the hold-down device of the top nozzle to come apart, requiring added steps and apparatus to prevent this or to later reassembly the hold-down device. The reconstitutable fuel assembly described and illustrated in the patent application cross-referenced above includes design improvements which overcome the aforementioned problems and shortcomings of the Klumb et al top nozzle design. Particularly, the top nozzle of the cross-referenced application is adapted to be removed and then replaced as a unitary subassembly on the guide thimbles.

Notwithstanding these improvements, several additional problems are inherent in the Klumb et al design. Only recognized recently, these problems are not addressed in the Kmonk et al patent nor in the improved top nozzle design of the cross-referenced application and so likewise are present in them. These problems arise from the impingement of coolant cross-flow from adjacent fuel assemblies on the hold-down springs of a given fuel assembly and the relative sliding engagement allowed between the upper ends of the alignment posts (or guide tube extensions) and the upper core support plate at the region of the holes defined therein which receive the upper ends of the alignment posts.

With regard to the first problem, cross-flow from adjacent fuel assemblies occurs because of the radial flow maldistribution across pressurized water reactor cores which is caused by core inlet flow maldistribution and by temperature differences across the core. Thus, there is a radial pressure gradient at the fuel assembly outlet which induces cross-flow above the fuel rods of the assembly. The hold-down springs in the Klumb et al type top nozzle are exposed to the cross-flow which has led to spring failure due to fatigue caused by flow induced vibration.

With regard to the second problem, relative motion occurs between the upper ends of the alignment posts and the upper core support plate because fuel assembly alignment with the upper core plate is accomplished by projecting the guide thimble mounted posts into the holes in the core plate and such alignment must accommodate axially-directed differential growth of the fuel assembly due to differential thermal expansion and irradiation growth. Core plate vibration also produces relative motion between the core plate hole and the thimble alignment post. Such relative motion accompanied by contact between the upper ends of the alignment posts and the hole region of the core plate results in wear of the core plate. Small amplitude vibration, even at low frequencies, can lead to appreciable wear when considered over long periods of time. Since the core plate has a forty year life, wear at the hole region therein can lead to expensive core plate rework to resize the holes.

Consequently, a need exists for a fresh approach to reconstitutable fuel assembly top nozzle design with the objective of eliminating the aforementioned problems of core plate wear and hold-down spring fatigue while retaining the capability of removal and reattachment of the top nozzle without the possibility of its hold-down device coming apart.

SUMMARY OF THE INVENTION

The present invention provides an improved top nozzle construction designed to satisfy the aforementioned needs. Specifically, the top nozzle of the present invention includes improved structures which eliminate relative moving contact or sliding engagement between the upper support plate of the reactor core and the hold-down structure of the top nozzle while providing removable mounting of the top nozzle as a unitary subassembly on the guide thimbles of a reconstitutable fuel assembly as well as desired alignment of the fuel assembly with the upper core support plate. Relative motion between the upper core plate and the alignment sleeves of the top nozzle still takes place but without damaging contact with one another. Consequently, there is no wear on the upper core plate. Any wear which might occur takes place between readily replaceable parts of the top nozzle. Deleterious affects on the hold-down springs of coolant cross-flow between fuel assemblies is substantially eliminated in the preferred form of the present invention by the incorporation of an enclosure wall about the perimeter of the top nozzle which protects the springs from flow induced vibration.

Accordingly, the present invention is directed to an improved top nozzle on a fuel assembly for aligning the fuel assembly with an upper core plate of a nuclear reactor core. The fuel assembly has a plurality of guide thimbles with respective upper end portions and the upper core plate has a lower side and a plurality of holes defined therein which open at its lower side. The improved top nozzle comprises: (a) lower means being stationarily supported on the upper end portions of the guide thimbles; (b) upper means having a plurality of passageways defined therethrough in a pattern which matches that of the guide thimbles and being adapted to abut the lower side of the upper core plate; (c) a plurality of upstanding means having respective central bores defined therethrough, each of the upstanding means being disposed above the upper means and attached thereto such that its central bore is aligned with a respective one of the passageways of the upper means, with each upstanding means also being of a cross-sectional size adapted to interfit within one of the holes in the upper core plate when the upper means abuts the lower side of the upper core plate; (d) a plurality of elongated tubular members having lower and upper ends and being releasably connected at their respective lower ends to the upper end portions of the guide thimbles and inserted at their respective upper ends into the passageways of the upper means for slidable movement within the passageways of the upper means and the corresponding aligned bores of the upstanding means; (e) a plurality of yieldable members disposed between the lower and upper means and supporting the upper means in a spaced relation above the lower means at a stationary position in which the upper means abuts the upper core plate with the upstanding means interfitted within the holes of the upper core plate; and (f) means interconnecting the spaced lower and upper means so as to accommodate movement of the lower means toward and away from the upper means upon axial movement of the guide thimbles of the fuel assembly toward and away from the upper core plate, the interconnecting means also being effective to limit movement of the lower means away from the upper means to maintain the yieldable members in a state of compression therebetween.

Therefore, concurrently as alignment of the fuel assembly with the upper core plate is achieved through abutting of the upper means with the upper core plate and interfitting of the upstanding means within the upper core plate holes, axial movement of the fuel assembly relative to the upper core plate is accommodated through movement of the lower means and the plurality of tubular members relative to the upper means. No wear is incurred by the upper core plate since there is no relative sliding engagement of the upper means, the plurality of upstanding means nor the plurality of tubular members of the improved top nozzle with the upper core plate.

More particularly, the lower means includes a lower adapter plate with a plurality of openings defined therethrough in a pattern which matches that of the guide thimbles such that the upper end portions of the guide thimbles are received therethrough and extend above the adapter plate. The elongated tubular members are releasably connected at their respective lower ends to the upper end portions of the guide thimbles extending above the lower adapter plate. Specifically, each of the lower ends of the respective tubular members is internally threaded for releasable threaded connection to an externally threaded section on each of the upper end portions of the respective guide thimbles. Furthermore, each of the tubular members has a lower portion of a cross-sectional size greater than an upper portion thereof and greater than the size of the passageway in the upper means such that the tubular member remains captured between the upper means and lower means when released from its connection with the respective one guide thimble.

Still further, the upper means is a hold-down plate composed of an array of hubs and ligaments extending between and interconnecting the hubs, with each of the hubs having one of the passageways defined therethrough. The interconnecting means includes at least one lug connected to each of at least several of the hubs and extending downwardly therefrom. Alternatively, the lug can be connected to each of at least several of the ligaments and extend downwardly therefrom. Finally, each upstanding means is a boss disposed above and connected to each of at least several of the hubs of the upper hold-down plate with the bore of the boss aligned with the passageway of the hub.

These and other advantages and attainments of the present invention will become apparent to those skilled in the art upon a reading of the following detailed description when taken in conjunction with the drawings wherein there is shown and described in illustrative embodiment of the invention.

BRIEF DESCRIPTION OF THE DRAWINGS

In the course of the following detailed description, reference will be made to the attached drawings in which.

DETAILED DESCRIPTION OF THE INVENTION

In the following description, like reference characters designate like or corresponding parts throughout the several views of the drawings. Also, in the following description, it is to be understood that such terms as "forward", "rearward", "left", "right", "upwardly", "downwardly", and the like are words of convenience and are not to be construed as limiting terms.

In General

Figure 1:
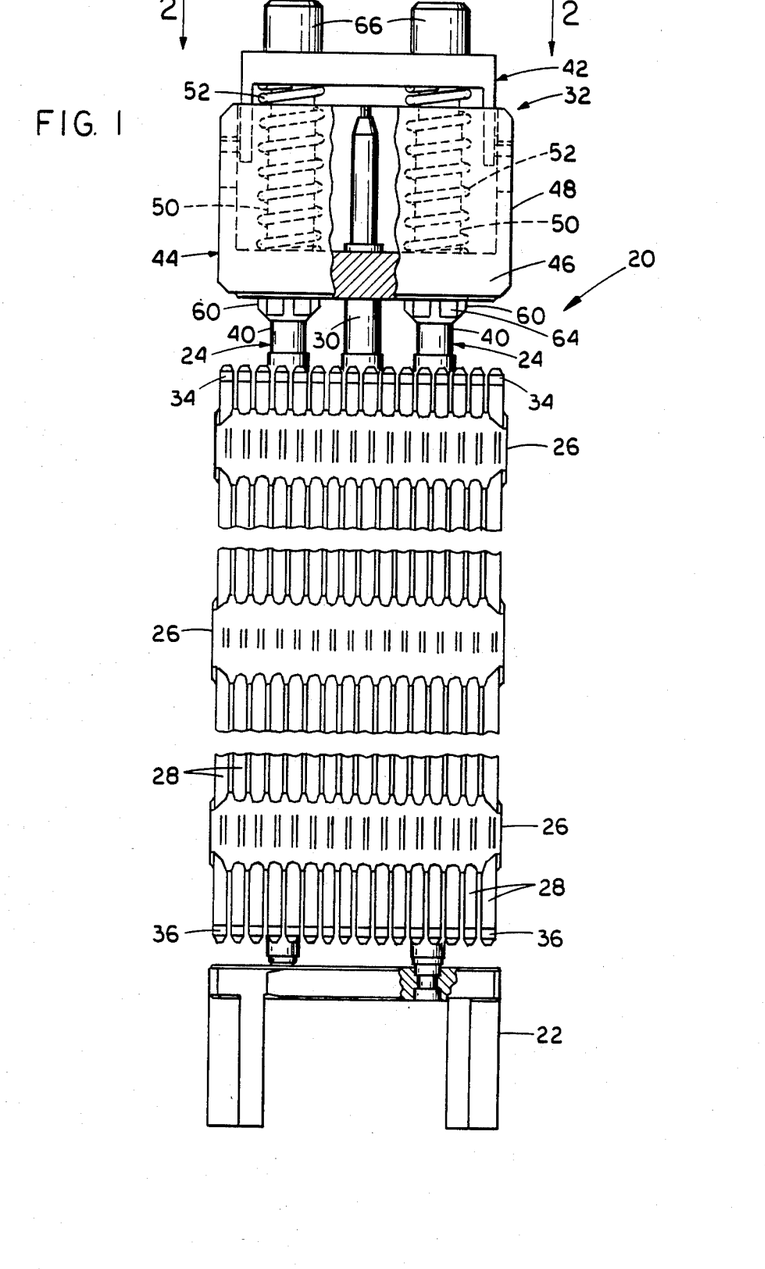
FIG. 1 is an elevational view, with parts broken away for clarity, of a fuel assembly having an improved top nozzle constructed in accordance with the principles of the present invention.

Referring now to the drawings, and particularly to FIG. 1, there is shown an elevational view of a reconstitutable nuclear reactor fuel assembly, represented in vertically foreshortened form and being generally designated by the numeral 20. Basically, the fuel assembly 20 includes a lower end structure or bottom nozzle 22 for supporting the assembly on the lower core plate (not shown) in the core region of a reactor (not shown), and a number of longitudinally extending guide tubes or thimbles 24 which project upwardly from the bottom nozzle 22. The assembly 20 further includes a plurality of transverse grids 26 axially spaced along the guide thimbles 24 and an organized array of elongated fuel rods 28 transversely spaced and supported by the grids 26. Also, the assembly 20 has an instrumentation tube 30 located in the center thereof and an upper end structure or top nozzle 32 attached to the upper ends of the guide thimbles 24 which incorporates certain improvements in accordance with the present invention which will be fully described below. With such an arrangement of parts, the fuel assembly 20 forms an integral unit capable of being conventionally handled without damaging the assembly parts.

As mentioned above, the fuel rods 28 in the array thereof in the assembly 20 are held in spaced relationship with one another by the grids 26 spaced along the fuel assembly length. Each fuel rod 28 includes nuclear fuel pellets (not shown) and is closed at its opposite ends by upper and lower end plugs 34,36. The fuel pellets composed of fissile material are responsible for creating the reactive power of the reactor. A liquid moderator/coolant such as water, or water containing boron, is pumped upwardly through the guide thimbles 24 and along the fuel rods 28 of the fuel assembly 20 in order to extract heat generated therein for the production of useful work.

To control the fission process, a number of control rods (not shown) are reciprocally movable in the guide thimbles 24 located at predetermined positions in the fuel assembly 20. Since the control rods are inserted into the guide thimbles 24 from the top of the fuel assembly 20, the placement of the components forming the improved top nozzle 32 and their attachment to the guide thimbles 24 must accommodate the movement of the control rods into the guide thimbles 24 from above the improved top nozzle 32.

Improved Top Nozzle for Aligning Fuel Assembly with Upper Core Plate

Turning now to FIGS. 1 to 4, there is shown the preferred embodiment of the improved top nozzle 32 which satisfies the design objectives of, first, eliminating relative moving engagement between the fuel assembly 20 and an upper core plate 38 (FIG. 4) of the reactor and thereby avoiding core plate wear, and, second, preventing coolant cross-flow between fuel assemblies and thereby preventing fatigue inducing vibration of certain components of the improved top nozzle 32.

The separate components making up the improved top nozzle 32 which is mounted on the upper end portions 40 of the guide thimbles 24 of the fuel assembly 20 include an upper hold-down plate 42, an enclosure 44 having a lower adapter plate 46 and an upstanding sidewall 48 surrounding and attached to the periphery of the adapter plate, a plurality of tubular sleeves 50 disposed between the upper and lower plates 42,46, and a plurality of hold-down coil springs 52 extending between the upper and lower plates 42,46 and about the respective sleeves 50. The upper hold-down plate 42 has a plurality of passageways 54 defined therethrough, while the lower adapter plate 46 has a plurality of openings 56, the passageways 54 and openings 56 being arranged in respective patterns which are matched to that of the guide thimbles 24 of the fuel assembly 20.

Figure 4:
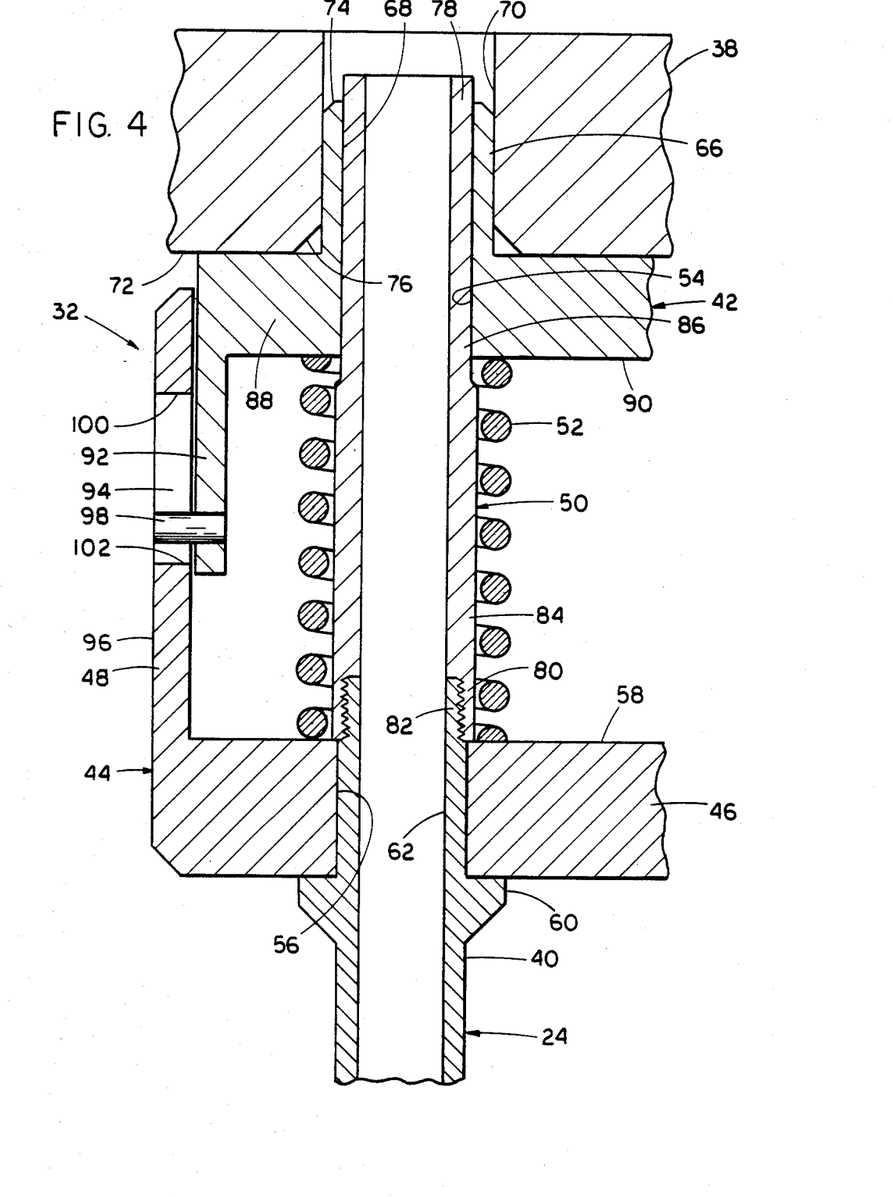
FIG. 4 is an enlarged fragmentary sectional view of the improved top nozzle as taken along line 4—4 of FIG. 2.

More particularly, the upper end portions 40 of the guide thimbles 24 extend upwardly through the openings 56 in the lower adapter plate 46 and above the upper surface 58 thereof. A plurality of lower retainers 60 are attached, such as by brazing, to the guide thimbles 24 below the lower adapter plate 46 for limiting downward slidable movement of the adapter plate 46 relative to the guide thimbles 24 and thereby supporting the adapter plate on the guide thimbles with upper ends 62 (only one of which is shown in FIG. 4) thereof extending above the adapter plate. Each lower retainer 60 on one guide thimble 24 has a series of scallops 64 formed on its periphery which are aligned with those of the fuel rods 28 grouped about the respective one guide thimble so that the fuel rods may be removed and replaced during reconstitution of the fuel assembly 20.

Furthermore, the improved top nozzle 32 includes a plurality of upstanding bosses 66 having respective central bores 68 defined therethrough. The bosses 66 are disposed above the upper hold-down plate 42, and each boss 66 is attached to the hold-down plate 42 such that its central bore 68 is aligned with a respective one of the passageways 54 of the hold-down plate. Additionally, each boss 66 is of a cross-sectional size adapted to interfit within one of a plurality of holes 70 (only one of which is seen in FIG. 4) formed in the upper core plate 38 which opens at a lower side 72 of the core plate. The upper circumferential edge 74 of each boss 66 is chamfered for mating with a complementarily chamfered edge 76 or the lower side 72 of the upper core plate 38 at the entrance to each of the holes 70 defined therein. Edges having such shapes act as guiding surfaces which facilitate alignment and insertion of the respective bosses 66 into the corresponding holes 70 in the upper core plate 38 during installatin of the fuel assembly within the reactor core.

Still further, the elongated sleeves 50 extending between the upper and lower plates 42,46 are slidably inserted at their respective upper ends 78 into the respective passageways 54 of the upper hold-down plate and the corresponding aligned bores 68 of the upstanding bosses 66. At their lower ends 80, the sleeves 50 are releasably connected to the upper ends 62 of the guide thimbles 24 so as to cooperate with the lower retainers 60 in holding the lower adapter plate 46 at a stationary position on the guide thimbles 24. Specifically, as seen in FIG. 4, each of the lower ends 80 of the sleeves 50 is internally threaded for making a releasable threaded connection with an externally threaded section 82 on each of the upper ends 62 of the respective guide thimbles 24. The sleeve 50 is hollow so that, in addition to accommodating insertion of a control rod through it, a suitable tool (not shown) can be inserted into the sleeve for gripping it internally to rotate it in either direction for threading on or unthreading from the upper end 62 of the guide thimble 24. When threaded on the upper end 62 of the guide thimble 24, the sleeve 50 cooperates with the lower retainer 60 to clamp the adapter plate 46 therebetween. The sleeves 50 slide axially in the passageways 54 of the hold-down plate 42 and the bores 68 of the bosses 66 to accommodate thermal growth between the fuel assembly 20 and the upper core plate 38. However, at no time does the sleeves 50 contact the upper core plate. Also, the sleeves protect the control rods (not shown) from cross-flow and supports the inside diameter of the hold-down springs 52 to prevent them from buckling.

When all of the sleeves 50 are unthreaded from the upper ends 62 of the respective guide thimbles 24, the improved top nozzle 32 is in condition for removal from the remainder of the fuel assembly 20 for reconstitution thereof. However, due to the crosssectional size of each of the sleeves 50, it stays in place between the upper and lower plates 42,46 of the top nozzle. Particularly, each sleeve 50 has a lower portion 84 of a cross-sectional diameter that is greater than that of an upper portion 86 thereof and also greater than the size of the diameter of the one passageway 54 of the upper hold-down plate 42. Thus, the sleeve 50 cannot be withdrawn through the passageway 54 and so it remains captured between the upper and lower plates 42,46, as also does the respective hold-down coil spring 52 encompassing the sleeve 50, when each sleeve is released from its threaded connection with its respective guide thimble 24.

Figure 2:
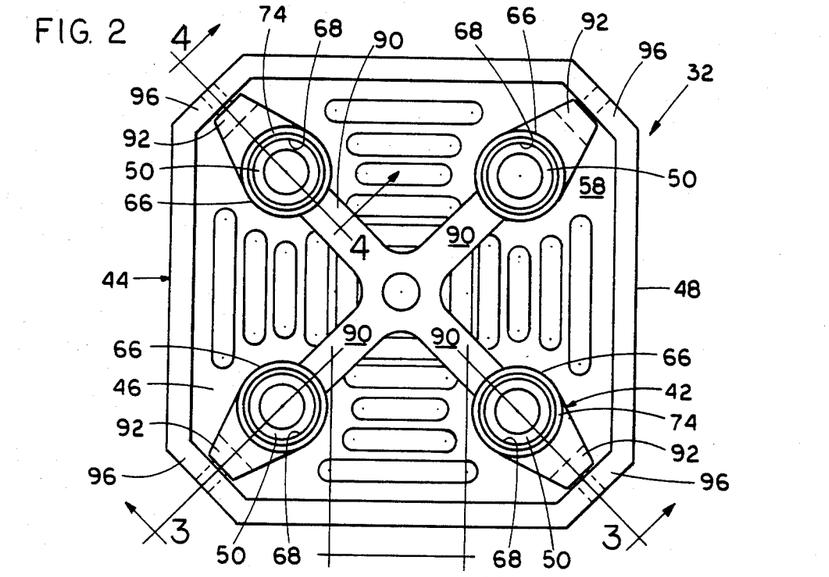
FIG. 2 is an enlarged top plan view of the improved top nozzle as seen along line 2—2 of FIG. 1, showing a preferred form of the components of the top nozzle.

As mentioned above, the hold-down coil springs 52 are disposed about the respective elongated sleeves 50 within the enclosure 44. Further, the springs 52 extend between the lower adapter plate 46 and the upper hold-down plate 42 and support the upper plate in a spaced relation above the lower plate at a stationary position in which the upper plate abuts the lower side 72 of the upper core plate 38 with the upstanding bosses 66 interfitted within the holes 70 of the upper core plate 38. Also, as seen in FIGS. 1 and 2, the upstanding sidewall 48 of the enclosure 44 substantially surrounds the springs 52 so as to protect them from impingement by coolant cross-flow within the reactor core.

Figure 5:
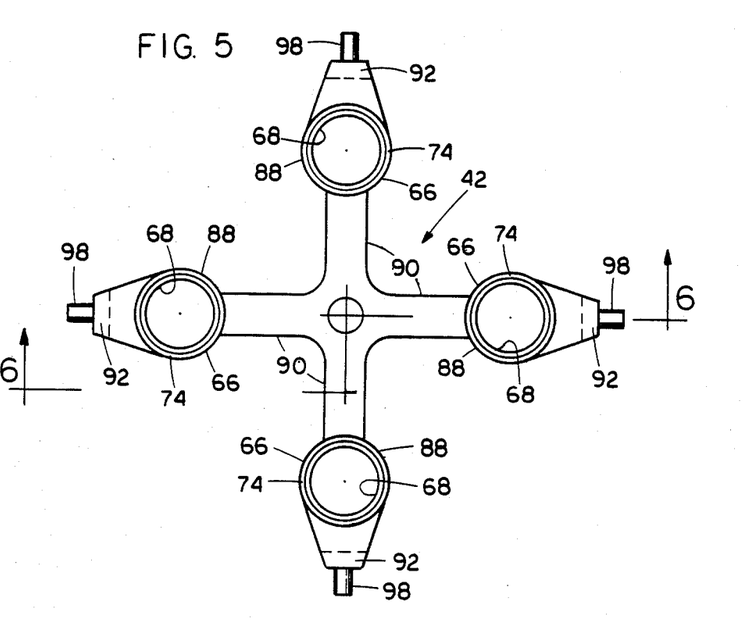
FIG. 5 is an enlarged top plan view of a hold-down plate of the improved top nozzle of FIG. 1, showing the hold-down plate, with bosses and lugs attached thereto, in a view similar to that seen in FIG. 2, but now disassembled from an enclosure of the top nozzle.
Figure 6:
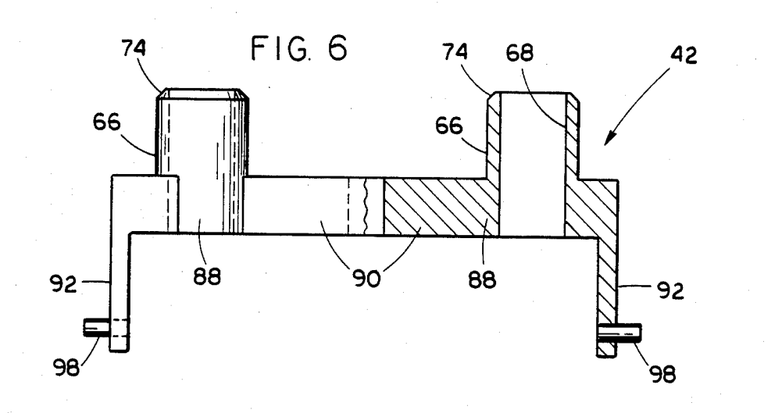
FIG. 6 is an elevational, partly sectioned, view of the hold-down plate, with the bosses and lugs attached thereto, as seen and taken along line 6—6 of FIG. 5.

In a preferred embodiment such as seen in FIGS. 5 and 6, the upper hold-down plate 42 is composed of an array of hubs 88 and ligaments 90 which extend between and interconnect the hubs. Each of the hubs 88 has one of the passageways 54 defined therethrough. Furthermore, one boss 66 is disposed above and connected to each of the hubs 88 with the bore 68 of the boss aligned with the respective passageway 54 of the hub.

Figure 3:
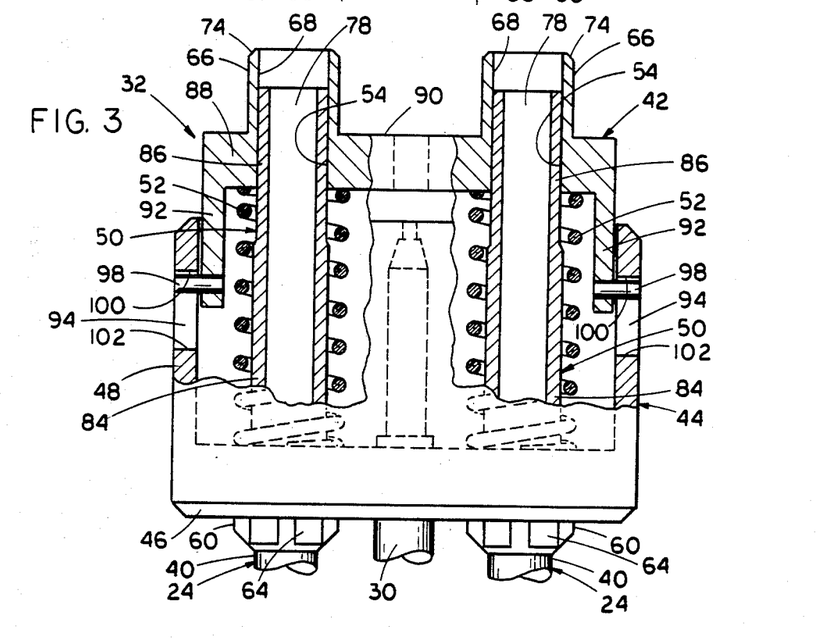
FIG. 3 is an enlarged elevational view of the improved top nozzle as taken along line 3—3 of FIG. 2, with parts thereof broken away and sectioned to reveal the components of the top nozzle.

Finally, the improved top nozzle 32 includes means interconnecting the spaced upper and lower plates 42,46 so as to accommodate movement of the lower plate 46 toward and away from the upper plate 42 upon axial movement of the guide thimles of the fuel assembly 20, such as due to thermal growth, toward and away from the upper core plate 38. Also, the interconnecting means is effective to limit movement of the lower adapter plate 46 away from the upper hold-down plate 42 so as to maintain the springs 52 in a state of compression therebetween and the sleeves 50 captured between the upper and lower plates. In particular, the interconnecting means includes a plurality of lugs 92 attached to the outer sides of the hubs 88 of the upper hold-down plate 42. The lugs 92 extend downwardly from the hubs 88 at the periphery of the upper plate 42 and are respectively coupled to the upstanding sidewall 48 of the enclosure 44. Specifically, a generally vertical slot 94 is defined in each of four corners 96 of the generally rectangular enclosure sidewall 48. Also, a pin 98 is mounted in the lower end of each lug 92 and extends into one of the slots 94 for slidably movement therealong between upper and lower ends 100,102 thereof which respectively define the limits of movement of the lower adapter plate 46 toward and away from the upper hold-down plate 42. The pin 98 is removable in order to facilitate the assembling and disassembling of the upper plate 42 with and from the enclosure 44.

When the fuel assembly 20 is free-standing or is being lifted via its hold-down plate 42, the lugs 92 contact the upper ends 100 of the slots 94 in the enclosure 44 so the load path is from a refueling machine gripper (not shown) to the hold-down plate 42, then via the lugs 92 and pins 98 to the enclosure 44 and adapter plate 46. From the latter, the load is transferred to the guide thimbles 24 of the fuel assembly via the above-described threaded connections between the sleeves 50 and the guide thimble upper ends 62.

Given the above-described components comprising the improved top nozzle 32 and cooperatively relationships between them, then it is readily seen that concurrently as alignment of the fuel assembly 20 with the upper core plate 38 is achieved through abutting of the upper hold-down plate 42 against the lower side 72 of the upper core plate and interfitting of the bosses 66 within the upper core plate holes 70, axial movement of the fuel assembly 20 relative to the upper core plate is accommodated. Furthermore, such accommodation is made, without incurring any wear of the upper core plate 38, through movement of the enclosure 44 and the plurality of elongated sleeves 50 relative to the upper hold-down plate 42 without relative sliding engagement of either of the upper hold-down plate 42, the plurality of upstanding bosses 66 and the plurality of elongated sleeves 50 of the improved top nozzle 20 with the upper core plate 38. In particular, during reactor operation, the hold-down springs 52 force the hold-down plate 42 into contact with the lower side 72 of the upper core plate 38 and the bosses 66 extend into the holes 70. The friction between the core plate 38 and hold-down plate 42 prevents differential motion between these components due to vibration. Since the axial motion between the fuel assembly and the upper core plate is accommodated by sliding between the sleeves and the hold-down plate and bosses, there is no wear on the core plate holes. All wear is on top nozzle components which are replacable with the fuel assembly.

Other alternative embodiments of the upper hold-down plate 42, enclosure 44 and lugs 92 are illustrated in FIGS. 7 to 14. Since these alternative embodiments are generally similar to the preferred embodiment of FIGS. 2 and 3, only their variations will be pointed out hereinafter.

Figure 7:
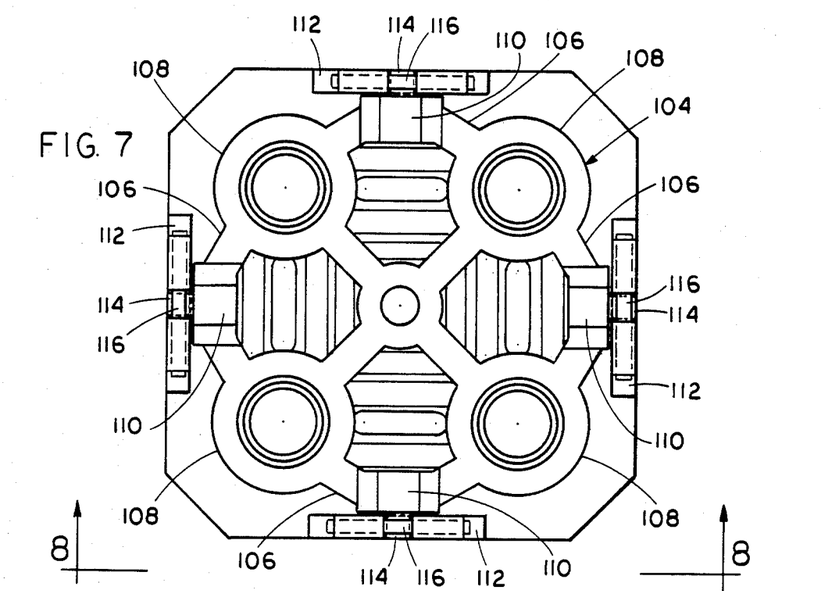
FIG. 7 is a top plan view similar to that of FIG. 2, but showing a first alternative embodiment of the hold-down plate and the enclosure of the improved top nozzle.
Figure 8:
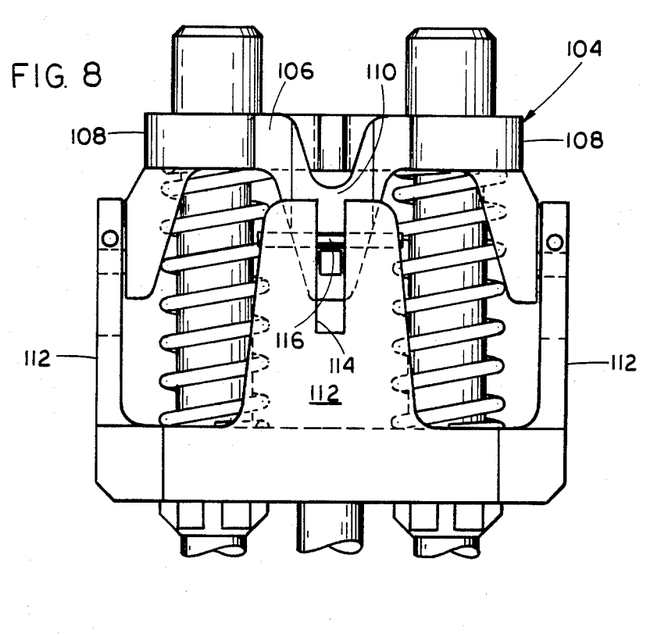
FIG. 8 is an elevational view of the first alternative embodiment of the improved top nozzle as seen along line 8—8 of FIG. 7.

In a first alternative embodiment seen in FIGS. 7 and 8, the hold-down plate 104 has a plurality of peripherally-arranged ligaments 106 interconnecting the hubs 108 with the interconnecting lugs 110 connected to and extending downwardly from the peripheral ligaments 106. The sidewall of the enclosure is discontinuous, that is to say, it is formed by a plurality of spaced upstanding wall portions 112 which each has a vertical slot 114 formed therein which opens at the upper end of the wall portion. A removable locking pin 116 is inserted horizontally into the upper end of the wall portion 112 to close the upper portion of the slot 114.

Figure 9:
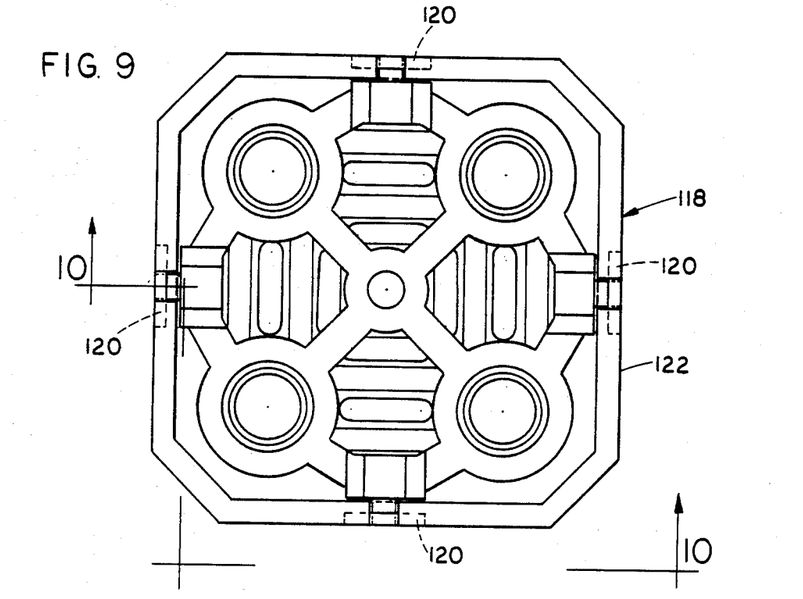
FIG. 9 is a top plan view similar to that of FIGS. 2 and 7, but showing a second alternative embodiment of the hold-down plate and the enclosure of the improved top nozzle.
Figure 10:
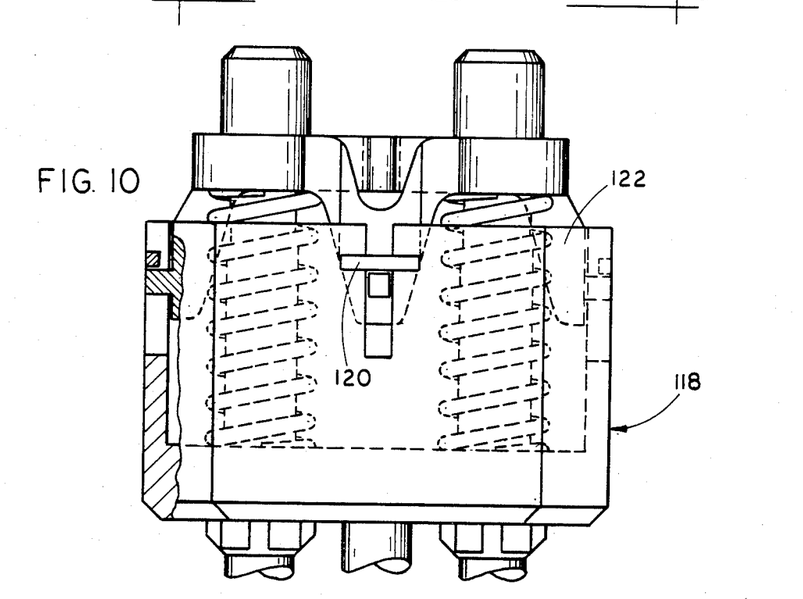
FIG. 10 is an elevational view of the second alternative embodiment of the improved top nozzle, with parts broken away and sectioned, as seen and taken along line 10—10 of FIG. 9.
Figure 11:
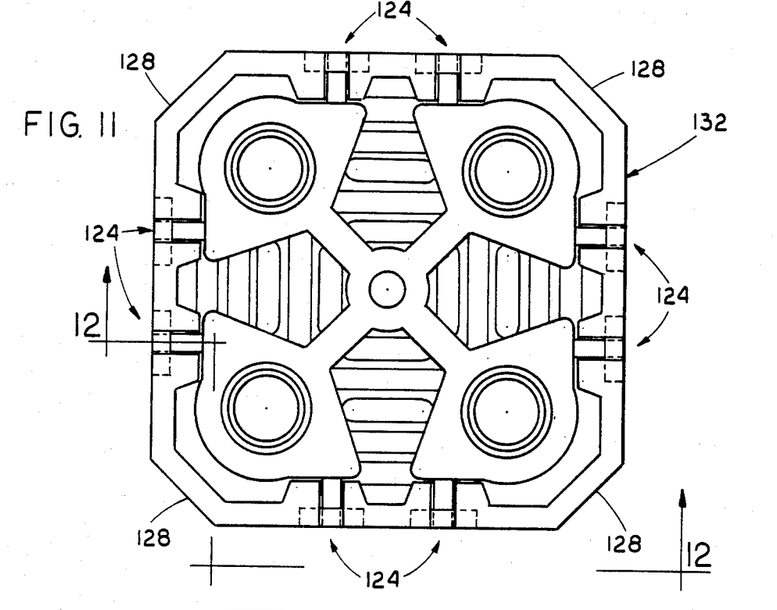
FIG. 11 is a top plan view similar to that of FIGS. 2, 7 and 9, but showing a third alternative embodiment of the hold-down plate and the enclosure of the improved top nozzle.
Figure 12:
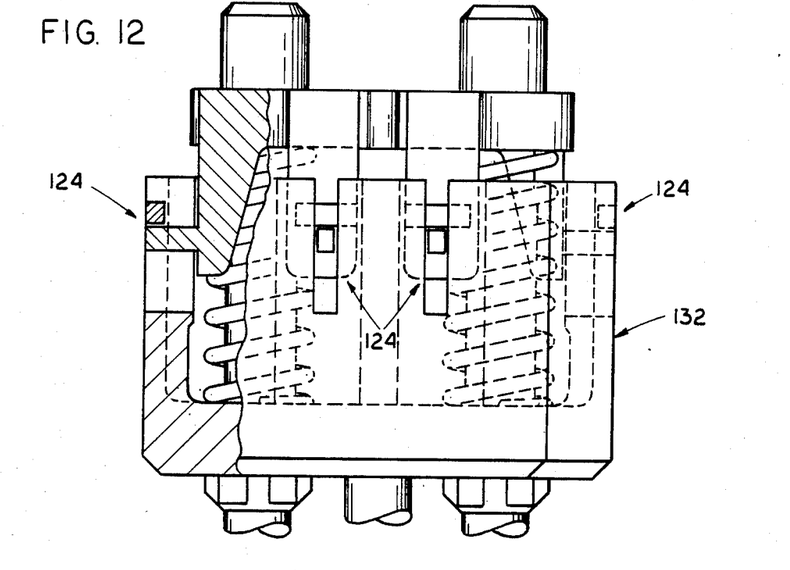
FIG. 12 is an elevational view of the third alternative embodiment of the improved top nozzle, with parts broken away and sectioned, as seen and taken along line 12—12 of FIG. 11.
Figure 13:
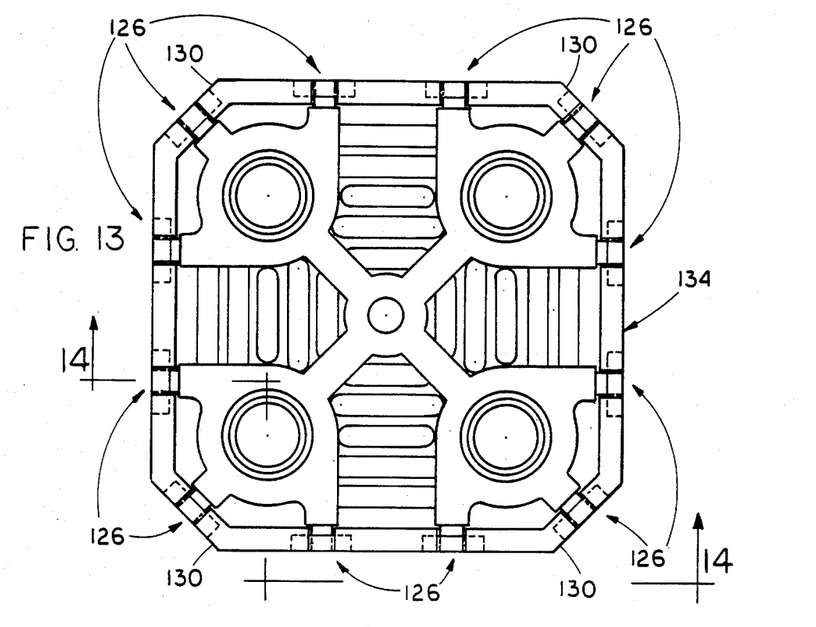
FIG. 13 is a top plan view similar to that of FIGS. 2, 7, 9 and 11, but showing a fourth alternative embodiment of the hold-down plate and the enclosure of the improved top nozzle.
Figure 14:
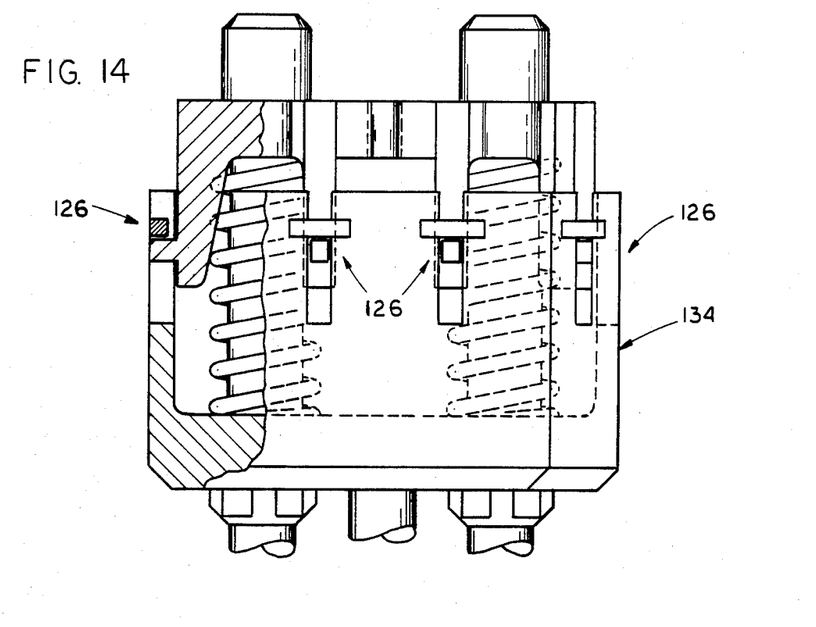
FIG. 14 is an elevational view of the fourth alternative embodiment of the improved top nozzle, with parts broken away and sectioned, as seen and taken along line 14—14 of FIG. 13.

The second alternative embodiment in FIGS. 9 and 10 differs mainly from the first alternative of FIGS. 7 and 8 in that the enclosure 118 is continuous as in the preferred embodiment and the locking pin is now a bar 120 seated in the upper edge of each of the four wall portions of the continuous sidewall 122.

The third and fourth alternative embodiments in FIGS. 11 and 12 and FIGS. 13 and 14, respectively, differ mainly from the second alternative of FIGS. 9 and 10 in arrangement of their respective interconnecting means, generally designated 124,126 respectively, generally between and adjacent to and at the corners 128,130 of their respective enclosures 132,134.

It is thought that the present invention and many of its attendant advantages will be understood from the foregoing description and it will be apparent that various changes may be made in the form, construction and arrangement thereof without departing from the spirit and scope of the invention or sacrificing all of its material advantages, the form hereinbefore described being merely a preferred or exemplary embodiment thereof.

We claim:

1. An improved top nozzle on a fuel assembly for aligning said fuel assembly with an upper core plate of a nuclear reactor core, said fuel assembly having a plurality of guide thimbles with respective upper end portions and said upper core plate having a lower side and a plurality of holes defined therein which open at said lower side, said top nozzle, comprising:

(a) lower means being stationarily supported on said upper end portions of said guide thimbles;

(b) an upper hold-down plate having a plurality of passageways defined therethrough in a pattern which matches that of said guide thimbles, said upper hold-down plate being adapted to abut said lower side of said upper core plate;

(c) a plurality of upstanding bosses having respective central bores defined therethrough, each of said upstanding bosses being disposed above said upper hold-down plate and rigidly attached thereto with its central bore aligned with a respective one of said passageways of said upper hold-down plate, said each upstanding boss also being of a cross-sectional size adapted to interfit within one of said holes in said upper core plate when said upper hold-down plate abuts said lower side of said upper core plate;

(d) a plurality of elongated tubular members having lower and upper ends and being releasably connected at their respective lower ends to said upper end portions of said guide thimbles and inserted at their respective upper ends into said passageways of said upper hold-down plate for slidable movement within said passageways of said upper hold-down plate and said corresponding aligned bores of said upstanding bosses;

(e) a plurality of yieldable members disposed between said lower means and upper hold-down plate and supporting said upper hold-down plate in a spaced relation above said lower means at a stationary position in which said upper hold-down plate abuts said upper core plate with said upstanding bosses interfitted within said holes of said upper core plate; and (f) means interconnecting said spaced lower means and upper hold-down plate so as to accommodate movement of said lower means toward and away from said upper hold-down plate upon axial movement of said guide thimbles of said fuel assembly toward and away from said upper core plate, said interconnecting means also being effective to limit movement of said lower means away from said upper hold-down plate to maintain said yieldable members in a state of compression therebetween, whereby concurrently as alignment of said fuel assembly with said upper core plate is achieved through abutting of said upper hold-down palte with said upper core plate and interfitting of said upstanding bosses within said upper core plate holes, axial movement of said fuel assembly relative to said upper core plate is accommodated, without incurring wear thereof, through movement of said lower means and said plurality of tubular members relative to said upper hold-down plate without relative sliding engagement of either of said upper hold-down plate, said plurality of upstanding bosses and said plurality of tubular members of said improved top nozzle with said upper core plate.

2. The improved top nozzle as recited in claim 1, wherein said interconnecting means includes:
   at least one wall structure connected to said lower means and extending upwardly therefrom; and
   at least one lug connected to said upper hold-down plate and extending downwardly therefrom, each of said lugs being coupled to said wall structure so as to accommodate movement of said lower means toward and away from said upper hold-down plate upon axial movement of said guide thimbles of said fuel assembly toward and away from said upper core plate.

3. The improved top nozzle as recited in claim 2, wherein said interconnecting means further includes:
   means defining a generally vertical slot in one of said wall structure and said lug; and
   a pin mounted to the other of said wall structure and said lug and extending into said slot in the one thereof, said pin being slidably moved along said slot as said lower means is moved toward and away from said upper hold-down plate, said slot having upper and lower ends which define upper and lower limits of said movement of said pin along said slot and thereby of said lower means toward and away from said upper hold-down plate.

4. The improved top nozzle as recited in claim 3, wherein said pin is removable to aid in assembling said top nozzle.

5. The improved top nozzle as recited in claim 1, wherein:
   said lower means includes a lower adapter plate with a plurality of openings defined therethrough in a pattern which matches that of said guide thimbles for receiving said upper end portions of said guide thimbles therethrough and extending above said adapter plate; and
   said elongated tubular members releasably connected at their respective lower ends to said upper end portions of said guide thimbles extending above said lower adapter plate.

6. The improved top nozzle as recited in claim 5, wherein each of said lower ends of said respective tubular members is internally threaded for releasable threaded connection to an externally threaded section on each of said upper end portions of said respective guide thimbles.

7. The improved top nozzle as recited in claim 5, wherein each of said tubular members has a lower portion of a cross-sectional size greater than an upper portion thereof and greater than the size of said passageway in said upper hold-down plate such that said tubular member remains captured between said upper hold-down plate and lower means when released from its connection with said respective one guide thimble.

8. The improved top nozzle as recited in claim 1, wherein said upper hold-down plate is composed of an array of hubs and ligaments extending between and interconnecting said hubs, each of said hubs having one of said passageways defined therethrough.

9. The improved top nozzle as recited in claim 8, wherein said interconnecting means includes at least one lug connected to each of at least several of said hubs and extending downwardly therefrom.

10. The improved top nozzle as recited in claim 8, wherein said interconnecting means includes at least one lug connected to each of at least several of said ligaments and extending downwardly therefrom.

11. The improved top nozzle as recited in claim 8, wherein said each upstanding boss is disposed above and connected to each of at least several of said hubs of said upper hold-down plate with said bore of said boss aligned with said passageway of said hub.

12. The improved top nozzle as recited in claim 1, wherein said each upstanding boss has an upper chamfered edge for mating thereof with a chamfered edge on said lower side of said upper core plate at the entrance to each of said holes defined in said lower side of said upper core plate so as to facilitate alignment and insertion of said each boss into one of said upper core plate holes.

13. The improved top nozzle as recited in claim 1, wherein said lower means includes an enclosure having a lower adapter plate and an upstanding sidewall surrounding the periphery of said lower adapter plate, said sidewall of said enclosure substantially surrounding said yieldable members so as to protect them from impingement by coolant cross-flow within said reactor core.

14. The improved top nozzle as recited in claim 13, wherein
   said interconnecting means includes a plurality of lugs attached to said upper hold-down plate and extending downwardly from the periphery thereof, each of said lugs being coupled to said upstanding sidewall of said enclosure so as to accommodate movement of said lower adapter plate toward and away from said upper hold-down plate upon axial movement of said guide thimbles of said fuel assembly toward and away from said upper core plate, said coupling of said lugs with said enclosure sidewall also being effective to limit movement of said lower adapter plate away from said upper hold-down plate to maintain said hold-down springs in a state of compression therebetween.

15. The improved top nozzle as recited in claim 14, wherein said interconnecting means further includes:
   means defining a plurality of generally vertical slots in said sidewall; and
   a plurality of pins each of which being mounted to one of said lugs and extending into one of said slots, said each pin being slidably moved along its respective slot as said lower adapter plate and sidewall are moved toward and away from said upper hold-down plate, said each slot having upper and lower ends which define upper and lower limts of said movement of said pin along said slot and thereby of said lower adapter plate toward and away from said upper hold-down plate.

16. An improved top nozzle on a fuel assembly for aligning said fuel assembly with an upper core plate of a nuclear reactor core, said fuel assembly having a plurality of guide thimbles with respective upper ends and said upper core plate having a lower side and a plurality of holes defined therein which open at said lower side, said top nozzle comprising:

(a) an enclosure having a lower adapter plate with a plurality of openings defined therethrough in a pattern which matches that of said guide thimbles for receiving said upper ends of said guide thimbles therethrough and an upstanding sidewall surrounding the periphery of said adapter plate;

(b) a plurality of lower retainers being attached to said respective guide thimbles below said lower adapter plate for limiting downward slidable movement of said adapter plate relative to said guide thimbles and supporting said adapter plate on said guide thimbles with said upper ends thereof extending above said adapter plate;

(c) an upper hold-down plate having a plurality of passageways defined therethrough in a pattern which matches that of said openings of said adapter plate, said upper hold-down plate being adapted to abut said lower side of said upper core plate;

(d) a plurality of upstanding bosses having respective central bores, each of said bosses being disposed above said upper hold-down plate and attached thereto such that its central bore is aligned with a respective one of said passageways of said upper hold-down plate, said each boss being of a crosssectional size adapted to interfit within one of said holes in said upper core plate when said upper hold-down plate abuts said lower side of said upper core plate;

(e) a plurality of elongated sleeves having upper and lower ends, said sleeves extending between said upper hold-down plate and lower adapter plate and being slidably inserted at their respective upper ends into said passageways of said upper hold-down plate and said corresponding aligned bores of said upstanding bosses and releasably connected at their respective lower ends to said upper ends of said guide thimbles so as to cooperate with said lower retainers in holding said lower adapter plate at a stationary position on said guide thimbles;

(f) a plurality of hold-down springs disposed within said enclosure and about said respective elongated sleeves, said springs extending between said lower adapter plate and upper hold-down plate and supporting said upper hold-down plate in a spaced relation above said lower adapter plate at a stationary position in which said upper hold-down plate abuts said upper core plate with said upstanding bosses interfitted within said holes of said upper core plate, said sidewall of said enclosure substantially surrounding said springs so as to protect them from impingement by coolant cross-flow within said reactor core; and (g) a plurality of lugs attached to said upper hold-down plate and extending downwardly from the periphery thereof, each of said lugs being coupled to said upstanding sidewall of said enclosure so as to accommodate movement of said lower adapter plate toward and away from said upper hold-down plate upon axial movement of said guide thimbles of said fuel assembly toward and away from said upper core plate, said coupling of said lugs with said enclosure sidewall also being effective to limit movement of said lower adapter plate away from said upper hold-down plate to maintain said hold-down springs in a state of compression therebetween, whereby concurrently as alignment of said fuel assembly with said upper core plate is achieved through abutting of said upper hold-down plate against said lower side of said upper core plate and interfitting of said bosses within said upper core plate holes, axial movement of said fuel assembly relative to said upper core plate is accommodated, without incurring wear thereof, through movement of said enclosure and said plurality of elongated sleeves relative to said upper hold-down plate without relative sliding engagement of either of said upper hold-down plate, said plurality of upstanding bosses and said plurality of elongated sleeves of said improved top nozzle with said upper core plate.

17. The improved top nozzle as recited in claim 16, wherein each of said lower ends of said respective tubular sleeves is internally threaded for releasable threaded connection to an externally threaded section on each of said upper ends of said respective guide thimbles.

18. The improved top nozzle as recited in claim 16, wherein each of said tubular sleeves has a lower portion of a cross-sectional size greater than an upper portion thereof and greater than the size of said passageway in said upper hold-down plate such that said tubular sleeve remains captured between said upper hold-down plate and lower adapter plate when released from its connection with said respective one guide thimble.

19. The improved top nozzle as recited in claim 16, wherein said upper hold-down plate is composed of an array of hubs and ligaments extending between and interconnecting said hubs, each of said hubs having one of said passageways defined therethrough.

20. The improved top nozzle as recited in claim 19, wherein at least one of said lugs is connected to each of at least several of said hubs and extends downwardly therefrom.

21. The improved top nozzle as recited in claim 19, wherein at least one of said lugs is connected to each of at least several of said ligaments and extends downwardly therefrom.

22. The improved top nozzle as recited in claim 19, wherein said each upstanding boss is disposed above and connected to each of at least several of said hubs of said upper hold-down plate with said bore of said boss aligned with said passageway of said hub.

23. The improved top nozzle as recited in claim 16, wherein said each upstanding boss has an upper chamfered edge for mating thereof with a chamfered edge on said lower side of said upper core plate at the entrance to each of said holes defined in said lower side of said upper core plate so as to facilitate alignment and insertion of said each boss into one of said upper core plate holes.

* * * * *